United States Patent
Nanri et al.

(10) Patent No.: US 12,128,888 B2
(45) Date of Patent: Oct. 29, 2024

(54) BEHAVIOR PREDICTION METHOD AND BEHAVIOR PREDICTION DEVICE FOR MOBILE UNIT, AND VEHICLE

(71) Applicant: Nissan Motor Co., Ltd., Yokohama (JP)

(72) Inventors: Takuya Nanri, Kanagawa (JP); Fang Fang, Kanagawa (JP); Shotaro Yamaguchi, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 393 days.

(21) Appl. No.: 17/442,507

(22) PCT Filed: Mar. 27, 2019

(86) PCT No.: PCT/IB2019/000379
§ 371 (c)(1),
(2) Date: Sep. 23, 2021

(87) PCT Pub. No.: WO2020/194017
PCT Pub. Date: Oct. 1, 2020

(65) Prior Publication Data
US 2022/0176952 A1 Jun. 9, 2022

(51) Int. Cl.
*B60W 30/00* (2006.01)
*B60W 30/095* (2012.01)

(52) U.S. Cl.
CPC ..... *B60W 30/0956* (2013.01); *B60W 2552/05* (2020.02); *B60W 2552/10* (2020.02);
(Continued)

(58) Field of Classification Search
CPC ......... B60W 30/0956; B60W 2552/05; B60W 2552/10; B60W 2554/4041;
(Continued)

(56) References Cited

U.S. PATENT DOCUMENTS

2017/0113665 A1 4/2017 Mudalige et al.
2018/0056997 A1* 3/2018 Ohmura ................ B60W 10/20
(Continued)

FOREIGN PATENT DOCUMENTS

JP 2006260217 A * 9/2006 ...... B60W 30/18154
JP 2010-083314 A 4/2010
(Continued)

OTHER PUBLICATIONS

Machine Translation of JP2006260217 (Year: 2017).*

*Primary Examiner* — Anne Marie Antonucci
*Assistant Examiner* — Jordan T Smith
(74) *Attorney, Agent, or Firm* — Young Basile Hanlon & MacFarlane, P.C.

(57) ABSTRACT

A behavior prediction method includes: determining a position of a host vehicle; determining a position of another vehicle in a second travel lane, the second travel lane being an opposite lane to a first travel lane in which the host vehicle travels; detecting an intersecting passage intersecting the second travel lane at a position ahead of the host vehicle; and determining whether or not the another vehicle is located within a predetermined range from an intersection position of the intersecting passage and the second travel lane to a point away from the intersection position by a predetermined distance in an opposite direction to a traveling direction of a vehicle in the second travel lane and the another vehicle is in either state of a stopped state and a decelerated state to predict that there is a probability that a mobile unit enters the first travel lane from the intersecting passage.

14 Claims, 13 Drawing Sheets

(52) U.S. Cl.
CPC ............... *B60W 2554/4041* (2020.02); *B60W 2554/4042* (2020.02); *B60W 2554/4044* (2020.02); *B60W 2554/4045* (2020.02); *B60W 2554/4049* (2020.02); *B60W 2720/10* (2013.01)

(58) Field of Classification Search
CPC . B60W 2554/4042; B60W 2554/4044; B60W 2554/4045; B60W 2554/4049; B60W 2720/10; B60W 2554/806; B60W 30/18154; G08G 1/166; G08G 1/167; G06V 2201/08; G06V 20/56
See application file for complete search history.

(56) References Cited

U.S. PATENT DOCUMENTS

| | | | |
|---|---|---|---|
| 2018/0218600 A1 | 8/2018 | Fujita | |
| 2018/0374345 A1* | 12/2018 | Suzuki | ..................... G08G 1/04 |
| 2020/0264622 A1* | 8/2020 | Tokumochi | .......... G05D 1/0221 |
| 2021/0209367 A1* | 7/2021 | Korjus | .................. G06V 20/56 |

FOREIGN PATENT DOCUMENTS

| | | |
|---|---|---|
| JP | 2010-097480 A | 4/2010 |
| JP | 2011-210095 A | 10/2011 |
| JP | 2018-034709 A | 3/2018 |
| JP | 2019-008433 A | 1/2019 |
| WO | 2018-198186 A1 | 11/2018 |

\* cited by examiner ately and are not restrictive of the invention.
BEHAVIOR PREDICTION METHOD AND BEHAVIOR PREDICTION DEVICE FOR MOBILE UNIT, AND VEHICLE

TECHNICAL FIELD

The present invention relates to a behavior prediction method and a behavior prediction device for mobile unit, and a vehicle.

BACKGROUND

In JP 2006-260217 A, a travel assistance device for vehicle that performs travel assistance control of detecting a blind spot, calculating, under the assumption that an object is present in the blind spot, a movable range when the object runs out, and performing avoidance operation lest the host vehicle collides with the object is described.

SUMMARY

However, constantly performing the travel assistance control under the assumption that an object runs out of a blind spot causes nonessential avoidance operation to be performed.

An object of the present invention is to improve prediction precision of the probability that another mobile unit enters a travel lane in which the host vehicle travels.

According to one aspect of the present invention, there is provided a behavior prediction method for a mobile unit including: determining a position of a host vehicle; determining a position of another vehicle in a second travel lane, the second travel lane being an opposite lane to a first travel lane in which the host vehicle travels; detecting an intersecting passage intersecting the second travel lane at a position ahead of the host vehicle; determining whether or not the another vehicle is located within a predetermined range from an intersection position of the intersecting passage and the second travel lane to a point away from the intersection position by a predetermined distance in an opposite direction to a traveling direction of a vehicle in the second travel lane and the another vehicle is in either state of a stopped state and a decelerated state; and when the another vehicle is located within the predetermined range and the another vehicle is in the either state of a stopped state and a decelerated state, predicting that there is a probability that a mobile unit enters the first travel lane from the intersecting passage.

According to the aspect of the present invention, prediction precision of the probability that another mobile unit enters a travel lane in which the host vehicle travels is improved.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION

Embodiments of the present invention will now be described with reference to the drawings.

First Embodiment (Configuration)

Figure 1:
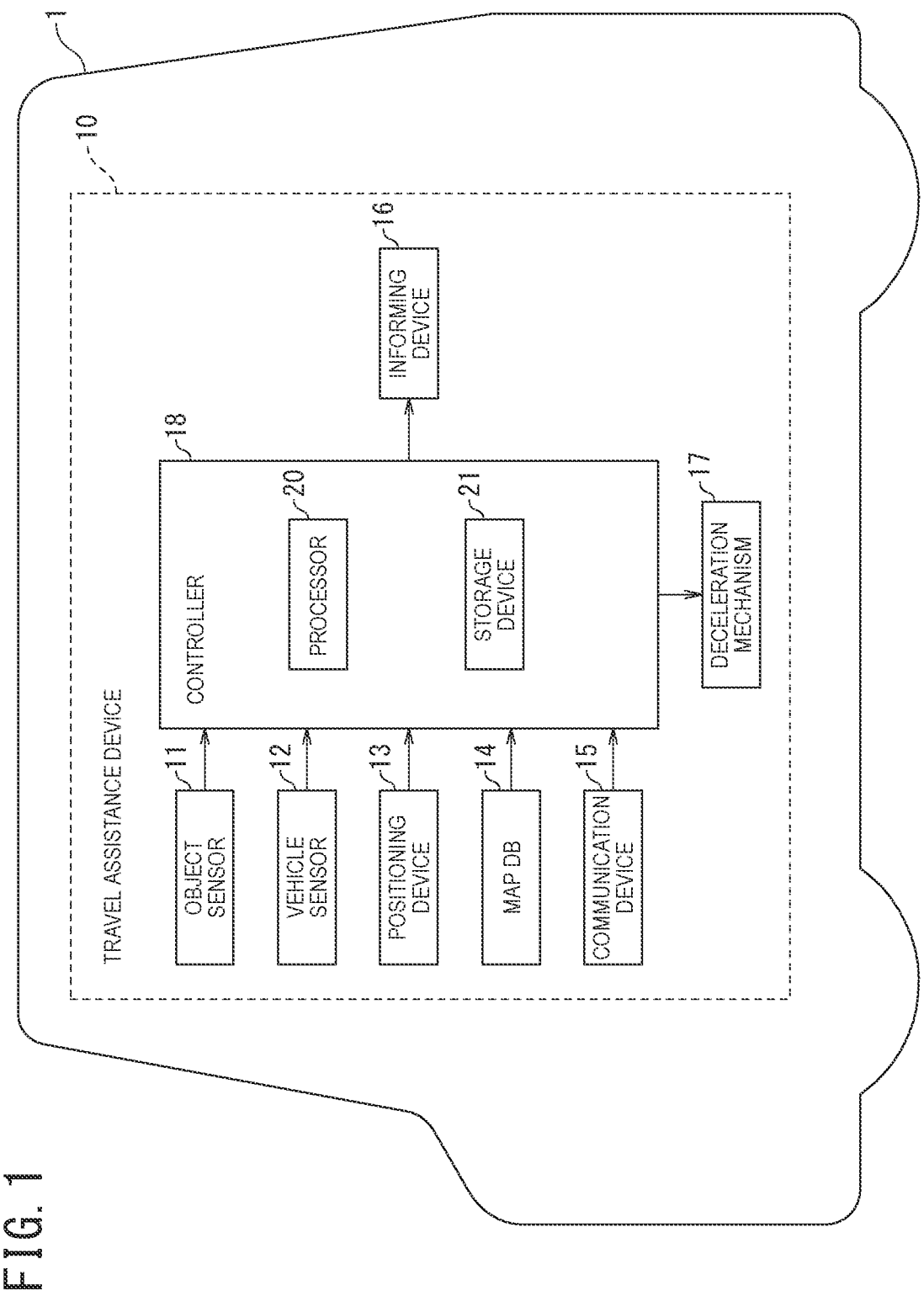
FIG. 1 is a schematic configuration diagram of a vehicle of embodiments.

FIG. 1 is now referred to. A host vehicle 1 includes a travel assistance device 10 configured to perform travel assistance for the host vehicle 1. The travel assistance performed by the travel assistance device 10 may include autonomous-driving control for making the host vehicle 1 autonomous-drive without involvement of a driver and driving assistance control for assisting a driver in driving the host vehicle 1, based on a travel environment around the host vehicle 1.

The driving assistance control may include not only travel control, such as automatic-steering, automatic-braking, constant speed traveling control, lane keeping control, and merging assistance control, but also outputting a message prompting the driver to perform a steering operation or a deceleration operation.

The travel assistance device 10 includes object sensors 11, vehicle sensors 12, a positioning device 13, a map database 14, a communication device 15, an informing device 16, a deceleration mechanism 17, and a controller 18. The map database is denoted as "map DB" in the drawings.

The object sensors 11 include a plurality of object detection sensors of different types, such as a laser radar, a millimeter-wave radar, and a camera, that are mounted on the host vehicle 1 and configured to detect objects around the host vehicle 1.

The vehicle sensors 12 are mounted on the host vehicle 1 and detect various information (vehicle signals) relating to a state of the host vehicle 1. The vehicle sensors 12 include, for example, a vehicle speed sensor configured to detect traveling speed (vehicle speed) of the host vehicle 1, wheel speed sensors configured to detect rotational speed of respective tires that the host vehicle 1 has, a triaxial acceleration sensor (G sensor) configured to detect acceleration (including deceleration) in three axial directions of the host vehicle 1, a steering angle sensor configured to detect a steering angle (including a turning angle), a gyro sensor configured to detect angular velocity generated in the host vehicle 1, and a yaw rate sensor configured to detect a yaw rate.

The positioning device 13 includes a global navigation satellite system (GNSS) receiver and receives radio waves from a plurality of navigation satellites and thereby measures a current position of the host vehicle 1. The GNSS receiver may be, for example, a global positioning system (GPS) receiver. The positioning device 13 may be, for example, an inertial navigation device.

The map database 14 stores high-definition map data (hereinafter, simply referred to as "high-definition map") that are suitable as a map for autonomous-driving. The high-definition map is map data of higher definition than map data for navigation (hereinafter, simply referred to as "navigation map") and includes lane-based information, which is more detailed than road-based information.

For example, the high-definition map includes, as the lane-based information, information of lane nodes that indicate reference points on a lane reference line (for example, a central line in a lane) and information of lane links that indicate forms of lane sections between lane nodes.

Information of each lane node includes an identification number and position coordinates of the lane node, the number of connected lane links, and identification numbers of connected lane links. Information of each lane link includes an identification number of the lane link, a type of the lane, width of the lane, types of lane boundary lines, a shape of the lane, a shape of a lane marking, and a shape of a lane reference line. The high-definition map further includes types and position coordinates of ground objects, such as a traffic light, a stop line, a road sign, a building, a utility pole, a curb, and a crosswalk, that exist on a lane or in the vicinity of the lane and information of the ground objects, such as identification numbers of lane nodes and identification numbers of lane links that correspond to the position coordinates of the ground objects.

Since the high-definition map includes lane-based node and link information, it is possible to specify a lane in which the host vehicle 1 travels along a travel route. The high-definition map has a coordinate system that can represent positions in the extending direction and width direction of each lane. The high-definition map has coordinates (for example, longitude, latitude, and altitude) that can represent positions in the three-dimensional space, and the lanes and the above-described ground objects may be described as shapes in the three-dimensional space.

The communication device 15 performs wireless communication with a communication device external to the host vehicle 1. A communication method used by the communication device 15 may be, for example, wireless communication through a public mobile telephone network, vehicle-to-vehicle communication, road-to-vehicle communication, or satellite communication.

The informing device 16 is an information output device configured to output information that the travel assistance device 10 presents to the driver for travel assistance (for example, a message prompting the driver to perform a steering operation or a deceleration operation). The informing device 16 may include, for example, a display device, a lamp, or a meter that outputs visual information or a speaker that outputs sound information.

The deceleration mechanism 17, using a mechanical brake, an engine brake, and a regenerative brake, gives braking force to rotation of wheels and thereby decelerates traveling speed of the host vehicle 1.

The controller 18 is an electronic control unit (ECU) that performs travel assistance control of the host vehicle 1. The controller 18 includes a processor 20 and peripheral components, such as a storage device 21. The processor 20 may be, for example, a central processing unit (CPU) or a micro-processing unit (MPU).

The storage device 21 includes a semiconductor storage device, a magnetic storage device, an optical storage device, and the like. The storage device 21 may include registers, a cache memory, and a memory, such as a read only memory (ROM) and a random access memory (RAM) that is used as a main storage device.

Functions of the controller 18, which will be described below, may be achieved by, for example, the processor 20 executing computer programs stored in the storage device 21.

Note that the controller 18 may be formed using dedicated hardware for performing information processing that will be described below.

For example, the controller 18 may include a functional logic circuit that is implemented in a general-purpose semiconductor integrated circuit. For example, the controller 18 may include a programmable logic device (PLD), such as a field-programmable gate array (FPGA), and the like.

When the travel assistance control is performed, the controller 18 predicts behavior of another mobile unit that enters a lane in which the host vehicle 1 travels in order to avoid collision with the other mobile unit. The controller 18 is an example of a behavior prediction device described in the claims.

Figure 2:
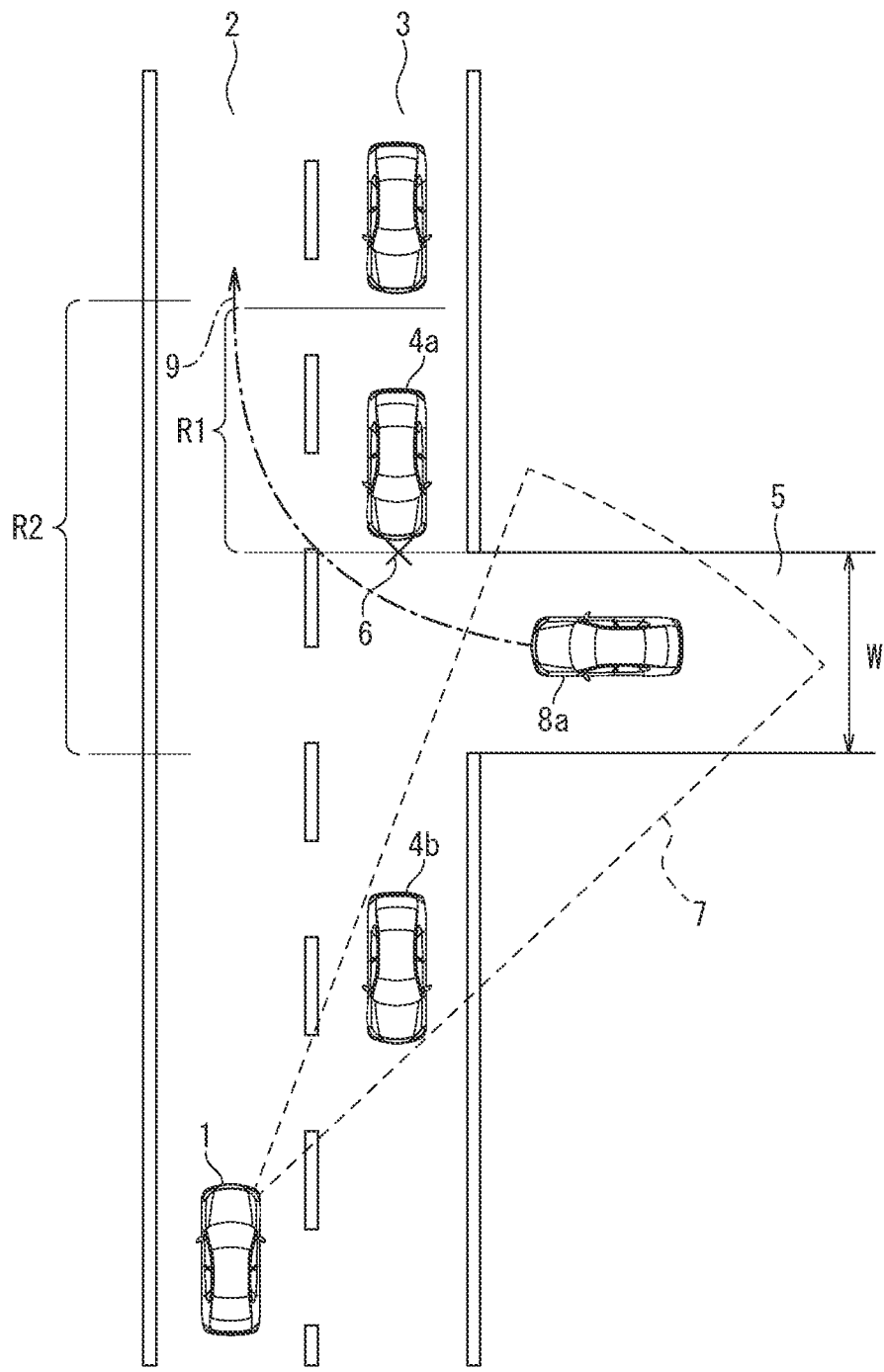
FIG. 2 is an explanatory diagram of a behavior prediction method in a first embodiment.

FIG. 2 illustrates a situation in which the host vehicle 1 travels in a first travel lane 2 and other vehicles 4a, 4b, and so on are present in a second travel lane 3 that is an opposite lane to the first travel lane 2. Note that, in the example illustrated in FIG. 2, vehicles travel on the left-hand side of the road. In other words, the traveling direction of the host vehicle 1 (that is, the traveling direction of vehicles on the first travel lane 2) is a direction directed from the lower side to the upper side on the plane of paper, and the traveling direction of the other vehicles 4a, 4b, and so on (that is, the traveling direction of vehicles on the second travel lane 3) is a direction directed from the upper side to the lower side on the plane of paper. In the following embodiments, description will be made using as an example a case where vehicles travel on the left-hand side of the road.

An intersecting passage 5 that intersects the second travel lane 3 exists ahead of the host vehicle 1. The intersecting passage 5 may be, for example, a side road or a private property exit. For example, the side road may be a narrow junction road at the junction point of which with the second travel lane 3 no traffic light is installed.

When another vehicle 4a in the second travel lane 3 is present within a predetermined range R1 located before an intersection position 6 at which the intersecting passage 5 and the second travel lane 3 intersect each other (that is, a predetermined range from the intersection position 6 to a point away from the intersection position 6 by a predetermined distance in the opposite direction to the traveling direction of vehicles traveling on the second travel lane 3) and the another vehicle 4a is in a stopped state or a decelerated state, it is considered that there is a probability that the another vehicle 4a yields a path to another mobile unit (for example, a vehicle, a motorcycle, a bicycle, or a pedestrian) coming out of the intersecting passage 5. Note that, hereinafter, being located before a position in each of the first travel lane 2 and the second travel lane 3 means being located on the front side of the position in the opposite direction to the traveling direction of a vehicle traveling in the lane. On the contrary, when the another vehicle 4a is present within the predetermined range R1 before the intersection position 6 and the another vehicle 4a is neither in a stopped state nor in a decelerated state, it is considered that no other mobile unit coming out of the intersecting passage 5 is present.

Therefore, when the another vehicle 4a is in a stopped state or a decelerated state in the predetermined range R1 before the intersection position 6, the controller 18 predicts that there is a probability that, as illustrated by an arrow 9, a vehicle 8a (that is, another mobile unit) enters the first travel lane 2 from the intersecting passage 5. Conversely, when the another vehicle 4a is neither in a stopped state nor in a decelerated state in the predetermined range R1, the controller 18 predicts that there is no probability that another mobile unit enters the first travel lane 2 from the intersecting passage 5.

This configuration enables the controller 18 to predict presence or absence of another mobile unit coming out of the intersecting passage 5, based on behavior of the another vehicle 4a even if the intersecting passage 5 is hidden in a blind spot 7 of still another vehicle 4b in the second travel lane 3.

Note that it is assumed that the intersection position 6 is a closest position to the predetermined range R1 within an entrance of the intersecting passage 5 to the second travel lane 3 and the state in which the another vehicle 4a is present in the predetermined range R1 is a state in which any part of the body of the another vehicle 4a is not out of the predetermined range R1. In other words, when a part of the body of the another vehicle 4a occupies a portion of the entrance of the intersecting passage 5 to the second travel lane 3 on the entrance side of the intersection position 6, the controller 18 determines that the another vehicle 4a blocks a path of another mobile unit (vehicle 8a) that is to enter the second travel lane 3 from the intersecting passage 5 and the another vehicle 4a does not yield a path to the other mobile unit coming out of the intersecting passage 5. However, the intersection position 6 is a position serving as a reference for determining whether or not the body of the another vehicle 4a blocks a path of the mobile unit (vehicle 8a) that is to enter the second travel lane 3 from the intersecting passage 5 as described above, and, when the road width of the intersecting passage 5 is wide enough, there is a case where the body of the another vehicle 4a does not block the path of the mobile unit (vehicle 8a) even if the body of the another vehicle 4a occupies a portion of the entrance of the intersecting passage 5 to the second travel lane 3 on the entrance side of the intersection position 6 to some extent. Therefore, the intersection position 6 does not necessarily have to be exactly a position closest to the predetermined range within the entrance of the intersecting passage 5 to the second travel lane 3 and may be set at a position located a predetermined distance inward of the entrance from the intersecting passage 5 from the position closest to the predetermined range within the entrance of the intersecting passage 5 to the second travel lane 3 to the extent of not blocking a path of a mobile unit that is to enter the second travel lane 3 from the intersecting passage 5.

Figure 3:
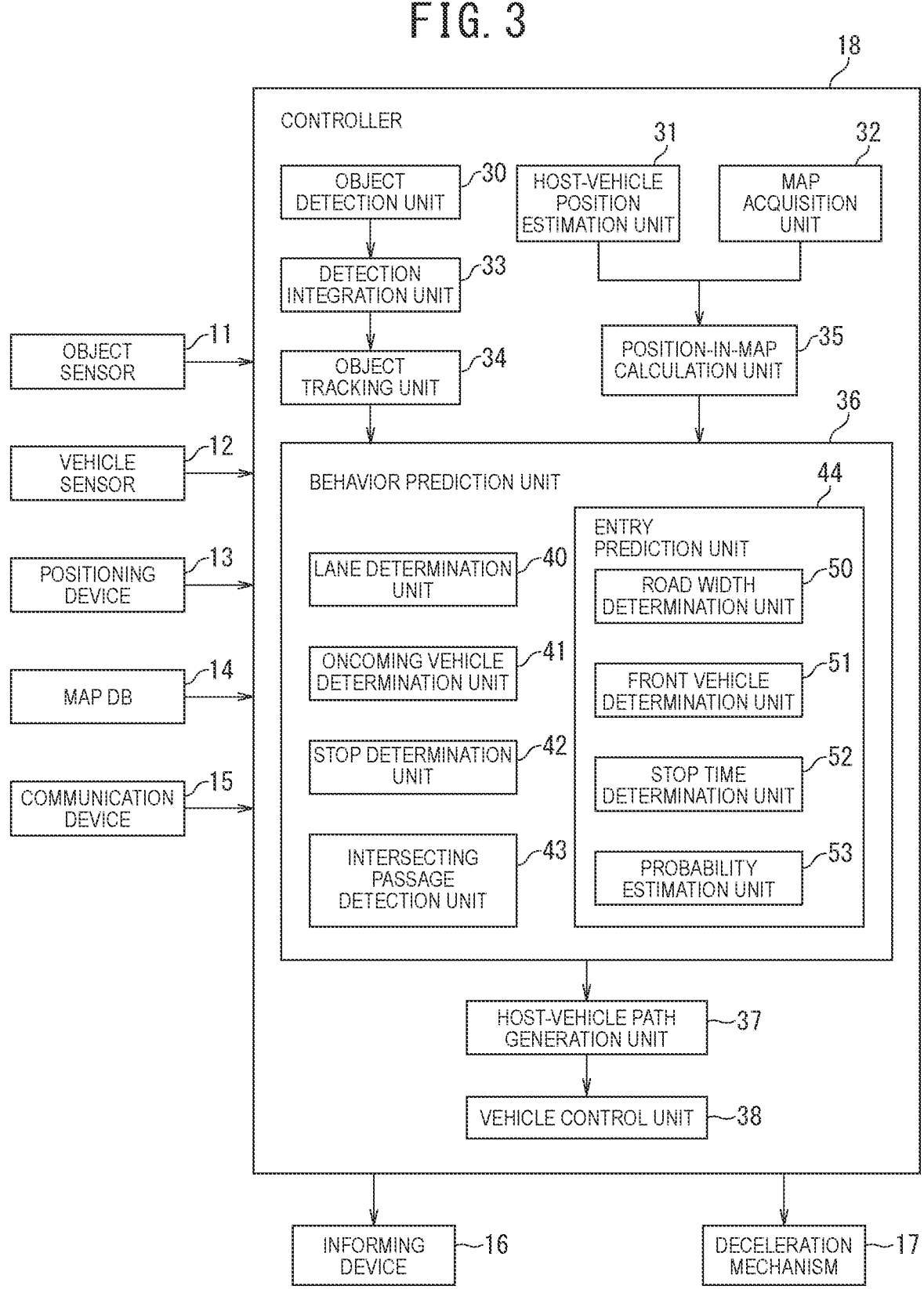
FIG. 3 is a block diagram illustrative of an example of a functional configuration of a travel assistance device in the first embodiment.

With reference to FIG. 3, functions of the controller 18 will be described in detail. The controller 18 includes an object detection unit 30, a host-vehicle position estimation unit 31, a map acquisition unit 32, a detection integration unit 33, an object tracking unit 34, a position-in-map calculation unit 35, a behavior prediction unit 36, a host-vehicle path generation unit 37, and a vehicle control unit 38.

The object detection unit 30 detects a position, an attitude, a size, a speed, and the like of an object, such as a vehicle, a motorcycle, a pedestrian, and an obstacle, around the host vehicle 1 with the host vehicle 1 as a reference, based on detection signals from the object sensors 11. The object detection unit 30 outputs a detection result of a two-dimensional position, an attitude, a size, a speed, and the like of an object represented in, for example, a zenith view (also referred to as a plan view), which is a view of the host vehicle 1 viewed from the air.

The host-vehicle position estimation unit 31 measures an absolute position of the host vehicle 1, that is, a position, an attitude, and a speed of the host vehicle 1 with respect to a predetermined reference point, based on a measurement result by the positioning device 13 and odometry using detection results from the vehicle sensors 12.

The map acquisition unit 32 acquires map information that indicates a structure of a road on which the host vehicle 1 travels from the map database 14. The map acquisition unit 32 may acquire map information from an external map data server through the communication device 15.

The detection integration unit 33 integrates a plurality of detection results that the object detection unit 30 has respectively acquired from a plurality of object detection sensors and outputs a single detection result with respect to each object.

Specifically, the detection integration unit 33 calculates, from behavior of an object acquired from the respective ones of the object detection sensors, the most reasonable behavior of the object that minimizes error in consideration of error characteristics and the like of the respective object detection sensors.

Specifically, the detection integration unit 33 comprehensively evaluates detection results acquired from a plurality of types of sensors by using a known sensor fusion technology and thereby acquires a more accurate detection result.

The object tracking unit 34 tracks an object detected by the object detection unit 30. Specifically, the object tracking unit 34 performs verification of identity (association) among objects detected at different time points from behavior of an object output at different time points, based on detection results integrated by the detection integration unit 33 and, based on the association, predicts behavior of the object, such as speed of the object.

The position-in-map calculation unit 35 estimates a position and an attitude of the host vehicle 1 on the map from the absolute position of the host vehicle 1, which is acquired by the host-vehicle position estimation unit 31, and the map information, which is acquired by the map acquisition unit 32. In addition, the position-in-map calculation unit 35 identifies a road on which the host vehicle 1 is traveling and also a lane in which the host vehicle 1 travels within the identified road.

The behavior prediction unit 36 predicts behavior of another object around the host vehicle 1, based on detection results acquired by the detection integration unit 33 and the object tracking unit 34 and a position of the host vehicle 1 identified by the position-in-map calculation unit 35.

Further, the behavior prediction unit 36 predicts whether or not there is a probability that another mobile unit enters the first travel lane 2, which is a lane in which the host vehicle travels, from the intersecting passage 5 intersecting the second travel lane 3, which is an opposite lane to the travel lane of the host vehicle 1, at a position ahead of the host vehicle 1.

The behavior prediction unit 36 includes a lane determination unit 40, an oncoming vehicle determination unit 41, a stop determination unit 42, an intersecting passage detection unit 43, and an entry prediction unit 44.

The lane determination unit 40 predicts a position on the map and an attitude of another vehicle around the host vehicle 1, based on detection results acquired by the detection integration unit 33 and the object tracking unit 34 and a position of the host vehicle 1 identified by the position-in-map calculation unit 35. The lane determination unit 40 determines to which lane in the map the another vehicle belongs.

The oncoming vehicle determination unit 41 determines whether or not another vehicle around the host vehicle 1 is an oncoming vehicle present in the second travel lane 3, which is an opposite lane to the first travel lane in which the host vehicle 1 travels. Based on this determination, the oncoming vehicle determination unit 41 determines whether or not the another vehicle 4a around the host vehicle 1 is an oncoming vehicle present in the second travel lane 3.

The stop determination unit 42 determines whether or not the another vehicle 4a is in a stopped state or a decelerated state when the another vehicle 4a is an oncoming vehicle. In the description of the present invention, the "stopped state" includes, in addition to a case where vehicle speed is 0, a state in which the vehicle speed is equal to or less than a predetermined vehicle speed that is substantially equal to 0.

The intersecting passage detection unit 43 detects the intersecting passage 5, which intersects the second travel lane 3 at a position ahead of the host vehicle 1, based on the map information.

Further, the intersecting passage detection unit 43 determines whether or not the position of the another vehicle 4a that is in a stopped state or a decelerated state is within a predetermined range R1 located before the intersection position 6 at which the intersecting passage 5 and the second travel lane 3 intersect each other (that is, a predetermined range from the intersection position 6 to a point away from the intersection position 6 by a predetermined distance in the opposite direction to the traveling direction of the second travel lane 3).

The entry prediction unit 44 determines whether or not there is a probability that a mobile unit enters the first travel lane 2 from the intersecting passage 5.

When the another vehicle 4a is neither in a stopped state nor in a decelerated state in the predetermined range R1, the entry prediction unit 44 predicts that there is no probability that another mobile unit enters the first travel lane 2 from the intersecting passage 5.

On the other hand, when the position of the another vehicle 4a that is in a stopped state or a decelerated state is within the predetermined range R1, the entry prediction unit 44 predicts that there is a probability that another mobile unit enters the first travel lane 2 from the intersecting passage 5.

For example, when the another vehicle 4a is in a stopped state or a decelerated state before the intersecting passage 5, it is considered that the another vehicle 4a yields a path to the vehicle 8a that is to come out of the intersecting passage 5.

For example, when the another vehicle 4a has turned approximately 90 degrees and changed its attitude at the entrance to the intersecting passage 5, it is considered that the probability that a pedestrian is crossing the intersecting passage 5 or the another vehicle 4a cannot enter the intersecting passage 5 because the intersecting passage 5 is congested is high. However, when the another vehicle 4a, without much turning, is stopped while leaving the entrance to the intersecting passage 5 open at the entrance to the intersecting passage 5, it is considered that there is a probability that the vehicle 8a is to come out of the intersecting passage 5 and the another vehicle 4a yields a path to the vehicle 8a.

In such a situation, the driver of the vehicle 8a, to which the another vehicle 4a yields a path, sometimes, considering that it is preferable to come out of the intersecting passage 5 immediately and thereby allow the another vehicle 4a to be restarted soon, makes the vehicle 8a come out of the intersecting passage 5 in a rapid movement. When the vehicle 8a moves to the travel lane 2 in which the host vehicle 1 travels in such a rapid movement, there is a probability that the host vehicle 1 and the vehicle 8a come close to each other more than assumed and, in that case, the host vehicle 1 and the vehicle 8a are required to decelerate rapidly.

The entry prediction unit 44 predicting such a situation in advance enables the host vehicle 1 to decelerate and go slowly before the intersecting passage 5 and to avoid rapid deceleration.

Note that, when it is determined that the intersecting passage 5 is a side road or a private property exit, the entry prediction unit 44 may determine whether or not there is a probability that the vehicle 8a enters the first travel lane 2 from the intersecting passage 5 as a mobile unit.

In addition, when it is determined that the intersecting passage 5 is a crosswalk, the entry prediction unit 44 may determine whether or not there is a probability that a pedestrian enters the first travel lane 2 from the intersecting passage 5 as a mobile unit. When the intersecting passage 5 is not any of a side road, a private property exit, and a crosswalk, the entry prediction unit 44 may determine that there is no probability that a mobile unit enters the first travel lane 2 from the intersecting passage 5.

In addition, the entry prediction unit 44 may determine whether or not the intersecting passage 5 is hidden in the blind spot 7 when viewed from the host vehicle 1 and predict whether or not there is a probability that a mobile unit enters the first travel lane 2 from the intersecting passage 5 only when the entry prediction unit 44 determines that the intersecting passage 5 is hidden in the blind spot 7. Note that, as used herein, the blind spot 7 means a blind spot when viewed from the driver of the host vehicle 1 or a blind spot for the object sensors 11, which detect an object around the host vehicle 1.

The entry prediction unit 44 includes a road width determination unit 50, a front vehicle determination unit 51, a stop time determination unit 52, and a probability estimation unit 53.

The road width determination unit 50 determines whether or not road width W of the intersecting passage 5 (see FIG. 2) is less than a predetermined value. The road width determination unit 50 may acquire information of the road width W from the map acquisition unit 32. The predetermined value is set at, for example, a width at which two vehicles can pass each other without special attention.

The probability estimation unit 53 estimates that the probability that a mobile unit enters the first travel lane 2 from the intersecting passage 5 is high when the road width W of the intersecting passage 5 is less than the predetermined value.

This is because, when the road width W of the intersecting passage 5 is less than the above-described predetermined value, the driver of the another vehicle 4a that passes the vehicle 8a bears a psychological and technical burden. Therefore, it is considered that the driver of the another vehicle 4a chooses to first let the vehicle 8a come out of the intersecting passage 5 in preference to passing the vehicle 8a in the intersecting passage 5, and the probability that the another vehicle 4a yields a path to the vehicle 8a increases.

The front vehicle determination unit 51 determines whether or not another vehicle is present in a range R2 of a predetermined distance ahead of the host vehicle 1 in the first travel lane 2 (see FIG. 2). The range R2 may be a range located ahead of and away from the host vehicle 1 as illustrated in FIG. 2 or a range from a point located forwardly away from the the position of the host vehicle 1 by a predetermined distance to the position of the host vehicle 1.

The probability estimation unit 53 estimates that the probability that a mobile unit enters the first travel lane 2 from the intersecting passage 5 is high when it is determined that no other vehicle is present in the range R2 of a predetermined distance ahead of the host vehicle 1.

This is because, when another vehicle is present ahead of the host vehicle 1 in the first travel lane 2, the probability that a mobile unit enters the first travel lane 2 from the intersecting passage 5 decreases, and, when, conversely, no other vehicle is present ahead of the host vehicle 1, a mobile unit is able to easily enter the first travel lane 2 from the intersecting passage 5.

The stop time determination unit 52 determines an elapsed time from a time point at which the another vehicle 4a came to a stop or a point of time at which the another vehicle 4a was observed to be stopped as a stop time of the another vehicle 4a. The stop time determination unit 52 determines whether or not the stop time of the another vehicle 4a is equal to or greater than a predetermined time.

When the stop time determination unit 52 determines that the stop time of the another vehicle 4a is equal to or greater than the predetermined time, the probability estimation unit 53 predicts that the probability that a mobile unit enters the first travel lane from the intersecting passage is low. This is because it is considered that, when the stop time is long, the another vehicle 4a is stopped because of some reason other than a mobile unit that is to come out of the intersecting passage 5.

As described above, the probability estimation unit 53 estimates the magnitude of the probability that a mobile unit enters the first travel lane from the intersecting passage, based on determination results by the road width determination unit 50, the front vehicle determination unit 51, and the stop time determination unit 52.

For example, the probability estimation unit 53 may estimate probability Pa that a mobile unit enters the first travel lane from the intersecting passage, based on the following formula (1).

$$Pa = Pr + Aw \times Xw + Af \times Xf - As \times Xs \quad (1)$$

In this formula, Pr is a basic probability (constant), Aw, Af, and As are positive coefficients, and Xw, Xf, and Xs are variables representing determination results by the road width determination unit 50, the front vehicle determination unit 51, and the stop time determination unit 52, respectively.

For example, the value of Xw is "1" when the road width W of the intersecting passage 5 is less than the predetermined value and "0" when the road width W of the intersecting passage 5 is equal to or greater than the predetermined value. The value of Xf is "1" when no other vehicle is present in the range R2 of a predetermined distance ahead of the host vehicle 1 and "0" when another vehicle is present in the range R2. The value of Xs is "1" when the stop time of the another vehicle 4a is equal to or greater than the predetermined time and "0" when the stop time of the another vehicle 4a is less than the predetermined time.

The host-vehicle path generation unit 37 generates a smooth target travel trajectory and speed profile in accordance with which the host vehicle 1 can travel without colliding with another object and performing rapid deceleration or rapid steering caused by behavior of the another object while complying with traffic rules (for example, the host vehicle 1 is required to travel along the first travel lane 2), based on a prediction result of the behavior of other objects around the host vehicle 1 predicted by the behavior prediction unit 36.

When the entry prediction unit 44 predicts that there is a probability that another mobile unit enters the first travel lane 2 from the intersecting passage 5, the host-vehicle path generation unit 37 generates a speed profile that decelerates or stops the host vehicle 1 in advance and a target travel trajectory that keeps the position of the host vehicle 1 away from the opposite lane.

For example, when the probability Pa that another mobile unit enters the first travel lane 2 from the intersecting passage 5 is equal to or greater than a threshold value, the host-vehicle path generation unit 37 generates a speed profile that decelerates or stops the host vehicle 1 in advance and a target travel trajectory that keeps the lateral position of the host vehicle 1 away from the second travel lane 3.

The vehicle control unit 38 performs travel control of the host vehicle 1 by driving the deceleration mechanism 17, an acceleration device, and a steering device, based on a target travel trajectory and a speed profile generated by the host-vehicle path generation unit 37.

This configuration enables the vehicle control unit 38 to operate the deceleration mechanism 17 and thereby decelerate the host vehicle 1 when the entry prediction unit 44 predicts that there is a probability that another mobile unit enters the first travel lane 2 from the intersecting passage 5 (or when the probability Pa is equal to or greater than the threshold value).

Note that the travel control performed by the vehicle control unit 38 does not necessarily require a target travel trajectory and a speed profile. For example, it is possible to perform braking control, acceleration control, and steering control based on relative distance between the host vehicle 1 and an object (for example, an obstacle) around the host vehicle 1.

When the entry prediction unit 44 predicts that there is a probability that another mobile unit enters the first travel lane 2 from the intersecting passage 5 (or when the probability Pa is equal to or greater than the threshold value), the behavior prediction unit 36 may operate the informing device 16 and thereby inform a passenger in the host vehicle 1 of an alarm.

In this case, the informing device 16 may output, for example, a sound message or a visual message providing information indicating that there is a probability that another mobile unit enters the first travel lane 2 from the intersecting passage 5.

(Operation)

Figure 4:
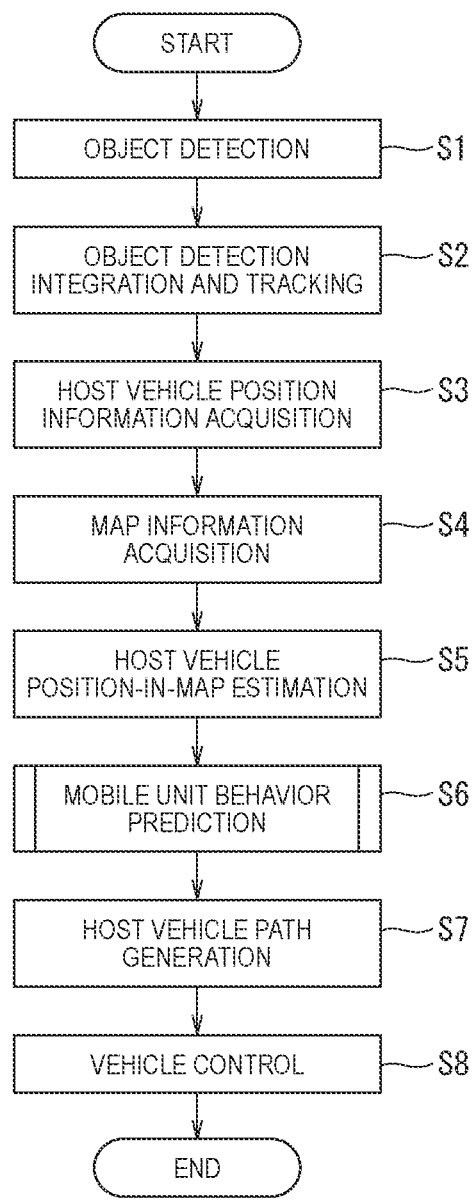
FIG. 4 is a flowchart of an example of a travel assistance method of the embodiments.

Next, an example of operation of the travel assistance device 10 in the present embodiment will be described with reference to FIG. 4.

In step S1, the object detection unit 30 detects a position, an attitude, a size, a speed, and the like of an object around the host vehicle 1, using a plurality of object detection sensors.

In step S2, the detection integration unit 33 integrates a plurality of detection results respectively acquired from the plurality of object detection sensors and outputs a single detection result with respect to each object. The object tracking unit 34 tracks respective objects that have been detected and the detection results of which have been integrated and predicts a position and behavior with respect to the host vehicle 1 of each object around the host vehicle 1.

In step S3, the host-vehicle position estimation unit 31 measures a position, an attitude, and a speed of the host vehicle 1 with respect to a predetermined reference point, based on a measurement result by the positioning device 13 and odometry using detection results from the vehicle sensors 12.

In step S4, the map acquisition unit 32 acquires map information that indicates a structure of a road on which the host vehicle 1 travels.

In step S5, the position-in-map calculation unit 35 estimates a position and an attitude of the host vehicle 1 on the map from the position of the host vehicle 1 measured in step S3 and the map data acquired in step S4.

In step S6, the behavior prediction unit 36 predicts a position on the map and a behavior of another vehicle around the host vehicle 1, based on the detection result acquired in step S2 (behavior of objects around the host vehicle 1) and the position of the host vehicle 1 identified in step S5.

The behavior prediction unit 36 predicts whether or not there is a probability that a mobile unit enters the first travel lane 2 from the intersecting passage 5. A mobile unit behavior prediction routine for predicting a probability that a mobile unit enters the first travel lane 2 from the intersecting passage 5 will be described later with reference to FIGS. 5 and 6.

In step S7, the host-vehicle path generation unit 37 generates a target travel trajectory and a speed profile of the host vehicle 1, based on the behavior of the another vehicle predicted in step S6.

When it is predicted that there is a probability that another mobile unit enters the first travel lane 2 from the intersecting passage 5 (or when the probability Pa is equal to or greater than a threshold value), the host-vehicle path generation unit 37 generates a speed profile that decelerates or stops the host vehicle 1 in advance and a target travel trajectory that keeps the position of the host vehicle 1 away from the opposite lane.

In step S8, the vehicle control unit 38 controls the host vehicle 1 in such a way that the host vehicle 1 travels in accordance with the target travel trajectory and the speed profile generated in step S7.

The mobile unit behavior prediction routine in FIG. 4 will be described with reference to FIG. 5.

In step S10, the lane determination unit 40 determines a position on the map of another vehicle 4a around the host vehicle 1, based on the detection results acquired by the detection integration unit 33 and the object tracking unit 34 and the position of the host vehicle 1 identified by the position-in-map calculation unit 35 and determines which lane in the map the another vehicle 4a belongs to.

In step S11, the oncoming vehicle determination unit 41 determines whether or not the another vehicle 4a around the host vehicle 1 is an oncoming vehicle in the second travel lane 3. When the another vehicle 4a is an oncoming vehicle (S11: Y), the process proceeds to step S12. When the another vehicle 4a is not an oncoming vehicle (S11: N), the process proceeds to step S15.

In step S12, the stop determination unit 42 determines whether or not the another vehicle 4a is in a stopped state or a decelerated state. When the another vehicle 4a is in a stopped state or a decelerated state (S12: Y), the process proceeds to step S13. When the another vehicle 4a is neither in a stopped state nor in a decelerated state (S12: N), the process proceeds to step S15.

In step S13, the intersecting passage detection unit 43 detects an intersecting passage 5 that intersects the second travel lane 3 at a position ahead of the host vehicle 1. The intersecting passage detection unit 43 detects whether or not the position of the another vehicle 4a is within a predetermined range R1 located before an intersection position 6 at which the intersecting passage 5 and the second travel lane 3 intersect each other. When the position of the another vehicle 4a is within the predetermined range R1 (S13: Y), the process proceeds to step S14. When the position of the another vehicle 4a is not within the predetermined range R1 (S13: N), the process proceeds to step S15.

In step S14, the entry prediction unit 44 predicts that there is a probability that a mobile unit enters the first travel lane 2 from the intersecting passage 5. A mobile unit entry prediction routine performed by the entry prediction unit 44 will be described later with reference to FIG. 6.

In step S15, the behavior prediction unit 36 determines whether or not the processing in steps S10 to S14 has been performed with respect to all other vehicles around the host vehicle 1. When the processing in steps S10 to S14 has been performed with respect to all other vehicles (S15: Y), the mobile unit behavior prediction routine is terminated and the process proceeds to step S7 in FIG. 4. When the processing in steps S10 to S14 has not been performed with respect to one of the other vehicles (S15: N), the other vehicle with respect to which the processing has not been performed is chosen as a processing target and the process returns to step S10.

The mobile unit entry prediction routine in FIG. 5 will be described with reference to FIG. 6.

In step S20, the road width determination unit 50 determines whether or not the road width W of the intersecting passage 5 (see FIG. 2) is less than a predetermined value.

In step S21, the front vehicle determination unit 51 determines whether or not another vehicle is present in a range R2 of a predetermined distance ahead of the host vehicle 1 in the first travel lane 2 (see FIG. 2).

In step S22, the stop time determination unit 52 determines whether or not the stop time of the another vehicle 4a is equal to or greater than a predetermined time.

In step S23, when the road width W of the intersecting passage 5 is less than the predetermined value, the probability estimation unit 53 estimates that the probability that a mobile unit enters the first travel lane 2 from the intersecting passage 5 is high.

When the front vehicle determination unit 51 determines that no other vehicle is present in the range R2 of a predetermined distance ahead of the host vehicle 1, the probability estimation unit 53 estimates that the probability that a mobile unit enters the first travel lane 2 from the intersecting passage 5 is high.

When the stop time determination unit 52 determines that the stop time of the another vehicle 4a is equal to or greater than the predetermined time, the probability estimation unit 53 predicts that the probability that a mobile unit enters the first travel lane from the intersecting passage is low.

Subsequently, the process returns to step S15 in FIG. 5.

Advantageous Effects of First Embodiment (1) The position-in-map calculation unit 35 determines a position of the host vehicle 1. The lane determination unit 40 and the oncoming vehicle determination unit 41 determine a position of the another vehicle 4a in the second travel lane 3, which is the opposite lane to the first travel lane 2 in which the host vehicle 1 travels. The intersecting passage detection unit 43 detects the intersecting passage 5, which intersects the second travel lane 3 at a position ahead of the host vehicle 1.

The intersecting passage detection unit 43 determines whether or not the another vehicle 4a is located within a predetermined range R1 from the intersection position 6 of the intersecting passage 5 and the second travel lane 3 to a point away from the intersection position 6 by a predetermined distance in the opposite direction to the traveling direction of vehicles in the second travel lane 3. The stop determination unit 42 determines whether or not the another vehicle 4a is in a stopped state or a decelerated state.

When the another vehicle 4a is located within the predetermined range R1 and the another vehicle 4a is in either state of the stopped state and the decelerated state, the entry prediction unit 44 predicts that there is a probability that a mobile unit enters the first travel lane 2 from the intersecting passage 5.

Predicting that there is a probability that a mobile unit enters the first travel lane 2 from the intersecting passage 5 as described above enables avoidance behavior to be taken in advance and a situation to be avoided in which a mobile unit entering the first travel lane 2 from the intersecting passage 5 and the host vehicle 1 come close to each other more than necessary and the mobile unit and the host vehicle 1 rapidly decelerate.

Since, when the another vehicle 4a is neither in a stopped state nor in a decelerated state in the predetermined range R1 before the intersection position 6, it is possible to predict that no other mobile unit coming out of the intersecting passage 5 is present, it is possible to improve prediction precision of the probability that another mobile unit enters the travel lane in which the host vehicle travels. Since, as a result, it is possible to reduce unnecessary deceleration, stop, or the like, it becomes possible to, for example, generate a target travel trajectory and a speed profile enabling high energy efficiency to be achieved in the autonomous-driving control.

(2) When the entry prediction unit 44 determines that the intersecting passage 5 is hidden in the blind spot 7 when viewed from the host vehicle, the entry prediction unit 44 predicts whether or not there is a probability that a mobile unit enters the first travel lane 2 from the intersecting passage 5.

This configuration enables whether or not there is a probability that a mobile unit enters the first travel lane 2 from the intersecting passage 5 to be predicted, based on behavior of the another vehicle 4a even if the intersecting passage 5 is hidden in the blind spot 7.

(3) When the entry prediction unit 44 determines that the intersecting passage 5 is a crosswalk, the entry prediction unit 44 predicts that there is a probability that a mobile unit enters the first travel lane 2 from the intersecting passage 5.

When the intersecting passage 5 is a crosswalk and the mobile unit is a pedestrian or a bicycle, the pedestrian or the bicycle sometimes crosses the first travel lane 2 somewhat hurriedly when the another vehicle 4a yields a path to the pedestrian or the bicycle. Predicting in advance a probability that a pedestrian or a bicycle enters the first travel lane 2 enables a situation to be avoided in which the host vehicle 1 and the pedestrian or bicycle come close to each other more than necessary and the host vehicle 1 and the pedestrian or bicycle rapidly decelerate.

(4) When the entry prediction unit 44 determines that the intersecting passage 5 is a side road or a private property exit, the entry prediction unit 44 predicts that there is a probability that a vehicle 8a enters the first travel lane 2 from the intersecting passage 5 as a mobile unit.

When the intersecting passage 5 is a side road or a private property exit and the mobile unit is the vehicle 8a, the vehicle 8a sometimes enters the first travel lane 2 somewhat hurriedly when the another vehicle 4a yields a path to the vehicle 8a. Predicting in advance a probability that the vehicle 8a enters the first travel lane 2 enables a situation to be avoided in which the host vehicle 1 and the vehicle 8a come close to each other more than necessary and the host vehicle 1 and the vehicle 8a rapidly decelerate.

(5) When the width W of the intersecting passage 5 is less than a predetermined value, the probability estimation unit 53 predicts that the probability that a mobile unit enters the first travel lane 2 from the intersecting passage 5 is high.

When the width W of the intersecting passage 5 is less than a predetermined value, the probability that the another vehicle 4a yields a path to a mobile unit to avoid passing the mobile unit in the intersecting passage 5 increases. Thus, it is possible to more accurately predict that the probability that a mobile unit enters the first travel lane 2 is high, and the host vehicle 1 and the mobile unit are able to avoid to come close to each other more than necessary and the host vehicle and the mobile unit are able to avoid to rapidly decelerate.

(6) When it is determined that no other vehicle is present in the range R2 of a predetermined distance ahead of the host vehicle 1 in the first travel lane 2, the probability estimation unit 53 estimates that the probability that a mobile unit enters the first travel lane 2 from the intersecting passage 5 is high.

This is because, since, when there is no vehicle and there is a space ahead of the host vehicle 1 in the first travel lane 2, a mobile unit can easily enter the first travel lane 2, the probability that the another vehicle 4a yields a path to the mobile unit increases. Thus, it is possible to more accurately predict that the probability that a mobile unit enters the first travel lane 2 is high, and the host vehicle 1 and the mobile unit are able to avoid to come close to each other more than necessary and the host vehicle and the mobile unit are able to avoid to rapidly decelerate.

(7) When it is determined that the stop time of the another vehicle 4a is equal to or greater than a predetermined time, the probability estimation unit 53 predicts that the probability that a mobile unit enters the first travel lane 2 from the intersecting passage 5 is low.

It is considered that, when the stop time is long, the another vehicle 4a is stopped because of some reason other than a mobile unit that is to come out of the intersecting passage 5. In such a case, predicting that the probability that a mobile unit enters the first travel lane 2 from the intersecting passage 5 is low enables prediction precision of the probability that another mobile unit enters a travel lane in which the host vehicle travels to be improved. As a result, it is possible to reduce unnecessary deceleration, stop, or the like.

Second Embodiment

Figure 7:
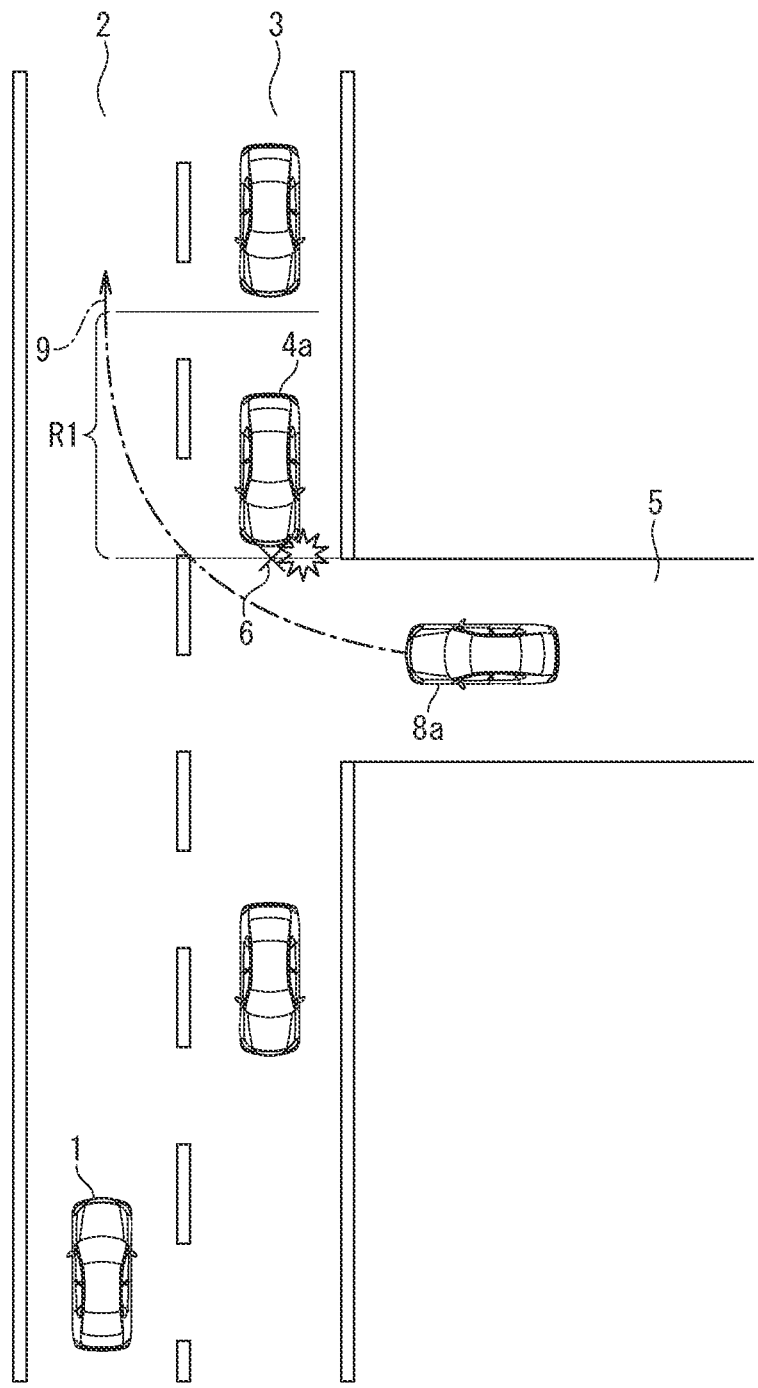
FIG. 7 is an explanatory diagram of a behavior prediction method in a second embodiment.

FIG. 7 illustrates a situation in which another vehicle 4a is in a stopped state or a decelerated state in a predetermined range R1 located before an intersection position 6 and has turned on a turn signal indicating an intention to turn to an intersecting passage 5. In such a case, it is considered that the another vehicle 4a with an intention to enter the intersecting passage 5 being in a stopped state or a decelerated state before the intersecting passage 5 means that there is a probability that an object blocking the entry is present in the intersecting passage 5 or the another vehicle 4a yields a path to another mobile unit that is to come out of the intersecting passage 5.

Thus, when the another vehicle 4a is in a stopped state or a decelerated state in the predetermined range R1 located before the intersection position 6 and has turned on a turn signal indicating an intention to turn to the intersecting passage 5 (that is, when a turn signal of the another vehicle 4a indicates an intention to move to the intersecting passage), a behavior prediction unit 36 predicts that there is a probability that another mobile unit enters a first travel lane 2 from the intersecting passage 5.

Figure 8:
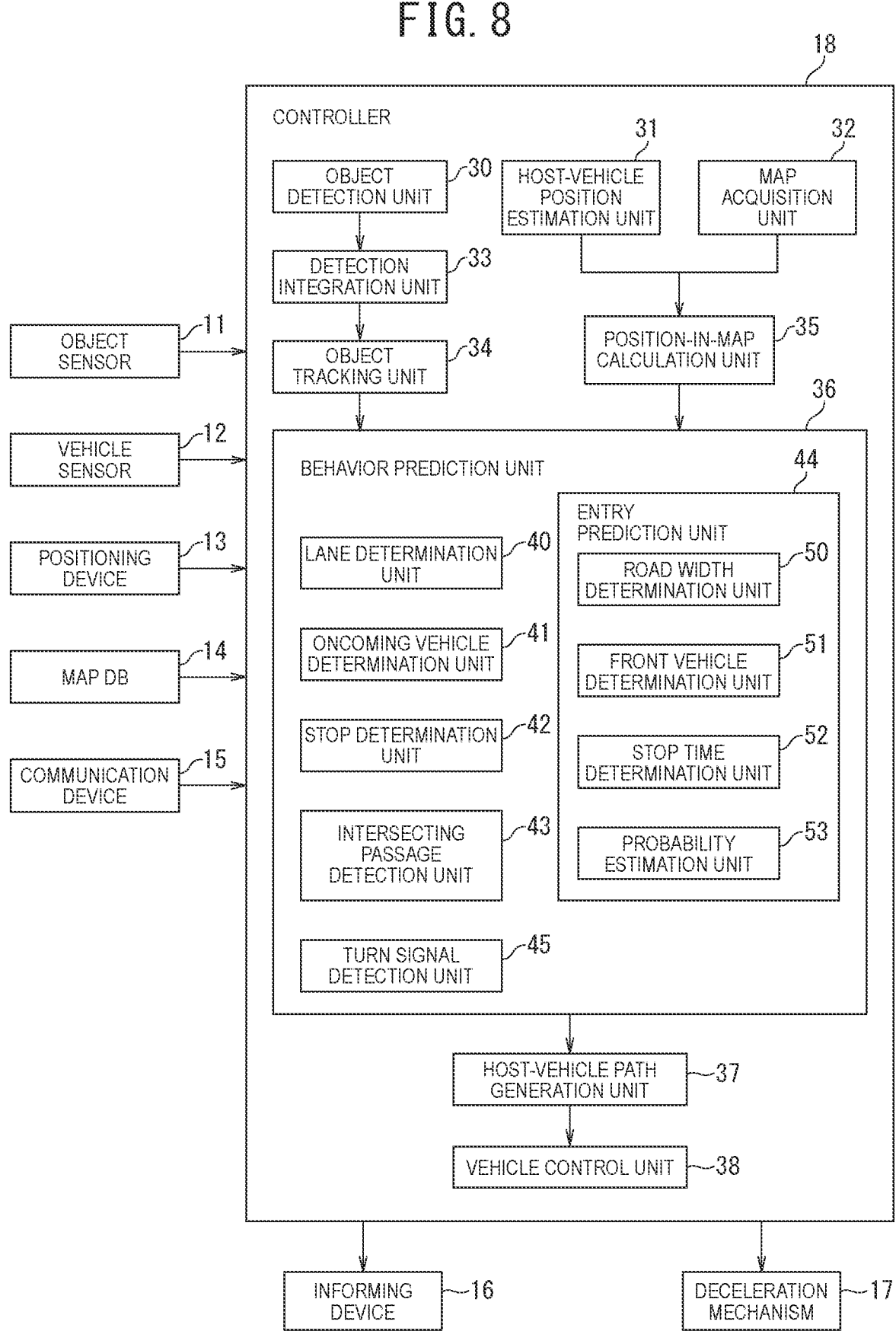
FIG. 8 is a block diagram illustrative of an example of a functional configuration of a travel assistance device in the second embodiment.

FIG. 8 is now referred to. A controller 18 of a second embodiment has a similar functional configuration to the functional configuration of the controller 18 of the first embodiment, and the same reference signs are assigned to the same constituent elements.

The behavior prediction unit 36 includes a turn signal detection unit 45.

The turn signal detection unit 45 detects turning on of a turn signal that indicates an intention to turn to the intersecting passage 5 among the turn signals of the another vehicle 4a in a second travel lane 3. Note that the turn signal detection unit 45, for example, includes a camera to capture an image of surroundings of the vehicle as an object sensor 11 and is capable of detecting turning on of a turn signal by detecting that an area in which yellow light flashes (a turn signal flashes) exists in an image that the camera captured. Alternatively, the turn signal detection unit 45 may receive a signal indicating turning on of a turn signal from the another vehicle 4a by means of vehicle-to-vehicle communication or the like and thereby detect turning on of the turn signal. The method for detecting turning on of a turn signal of the another vehicle 4a is not specifically limited.

When the another vehicle 4a is in a stopped state or a decelerated state in the predetermined range R1 located before the intersection position 6 and has turned on a turn signal indicating an intention to turn to the intersecting passage 5, an entry prediction unit 44 predicts that there is a probability that another mobile unit enters the first travel lane 2 from the intersecting passage 5.

For example, when the another vehicle 4a is in a stopped state or a decelerated state in the predetermined range R1 located before the intersection position 6 and has turned on a turn signal indicating an intention to turn to the intersecting passage 5, it is considered that the another vehicle 4a that is to enter the intersecting passage 5 is in a stopped state or a decelerated state before the intersecting passage 5 and yields a path to a vehicle 8a that is to come out of the intersecting passage 5.

For example, when the another vehicle 4a has turned approximately 90 degrees and changed its attitude at the entrance to the intersecting passage 5, it is considered that the probability that a pedestrian is crossing the intersecting passage 5 or the another vehicle 4a cannot enter the intersecting passage 5 because the intersecting passage 5 is congested is high. However, when the another vehicle 4a, without much turning, is stopped while leaving the entrance to the intersecting passage 5 open at the entrance to the intersecting passage 5, it is considered that there is a probability that the vehicle 8a is to come out of the intersecting passage 5 and the another vehicle 4a yields a path to the vehicle 8a.

In such a situation, the driver of the vehicle 8a, to which the another vehicle 4a yields a path, sometimes, considering that it is preferable to come out of the intersecting passage 5 immediately and thereby allow the another vehicle 4a to be restarted soon, makes the vehicle 8a come out of the intersecting passage 5 in a rapid movement. When the vehicle 8a comes out to the travel lane 2 in which the host vehicle 1 travels in such a rapid movement, there is a probability that the host vehicle 1 and the vehicle 8a come close to each other more than assumed and, in that case, the host vehicle 1 and the vehicle 8a are required to decelerate rapidly.

The entry prediction unit 44 predicting such a situation in advance enables the host vehicle 1 to decelerate and go slowly before the intersecting passage 5 and to avoid rapid deceleration.

On the other hand, when the another vehicle 4a has not turned on a turn signal indicating an intention to turn to the intersecting passage 5, the entry prediction unit 44 predicts that there is no probability that another mobile unit enters the first travel lane 2 from the intersecting passage 5.

Since, because of this configuration, it is possible to predict that no other mobile unit coming out of the intersecting passage 5 is present, it is possible to improve prediction precision of the probability that another mobile unit enters the travel lane in which the host vehicle travels.

Figure 9:
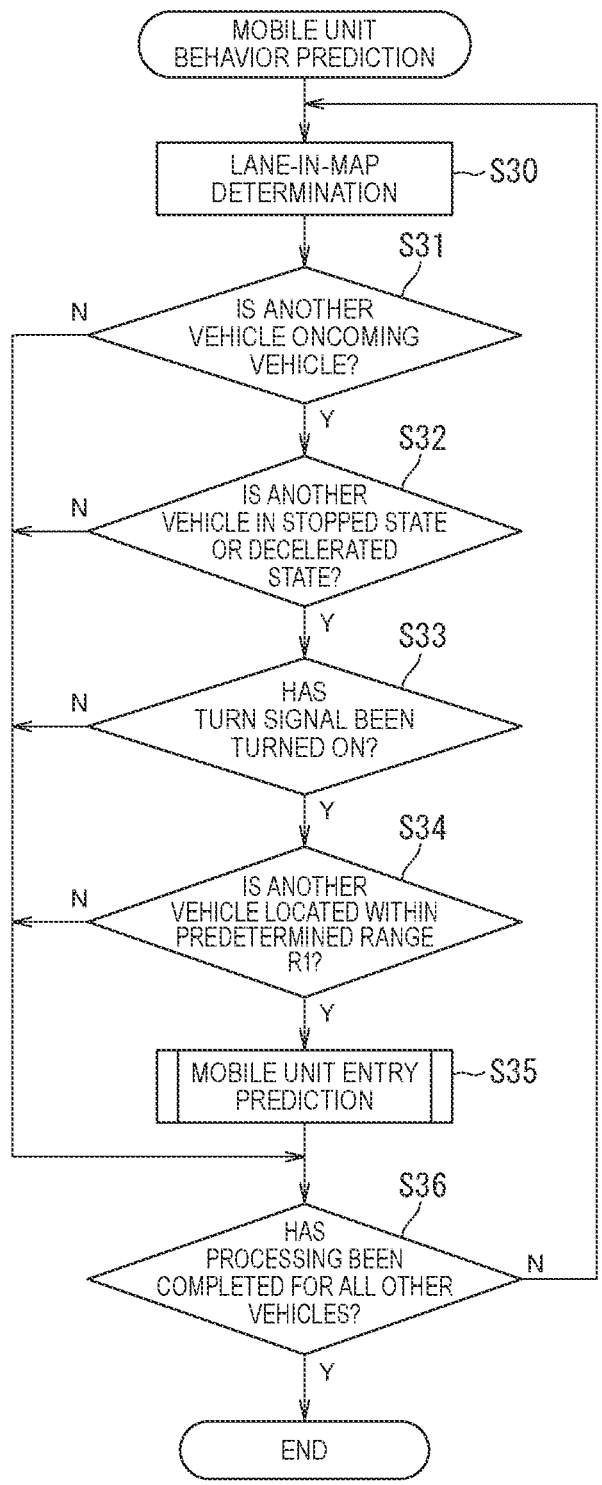
FIG. 9 is a flowchart of a mobile unit behavior prediction routine in the second embodiment.

A mobile unit behavior prediction routine of the second embodiment will be described with reference to FIG. 9. Processing in steps S30 and S31 are the same as the processing in steps S10 and S11 in FIG. 5.

In step S32, a stop determination unit 42 determines whether or not the another vehicle 4a is in a stopped state or a decelerated state. When the another vehicle 4a is in a stopped state or a decelerated state (S32: Y), the process proceeds to step S33. When the another vehicle 4a is neither in a stopped state nor in a decelerated state (S32: N), the process proceeds to step S36.

In step S33, the turn signal detection unit 45 detects whether or not the another vehicle 4a in the second travel lane 3 has turned on a turn signal indicating an intention to turn to the intersecting passage 5. When the another vehicle 4a has turned on a turn signal indicating an intention to turn to the intersecting passage 5 (step S33: Y), the process proceeds to step S34. When the another vehicle 4a has not turned on a turn signal indicating an intention to turn to the intersecting passage 5 (step S33: N), the process proceeds to step S36.

Figure 5:
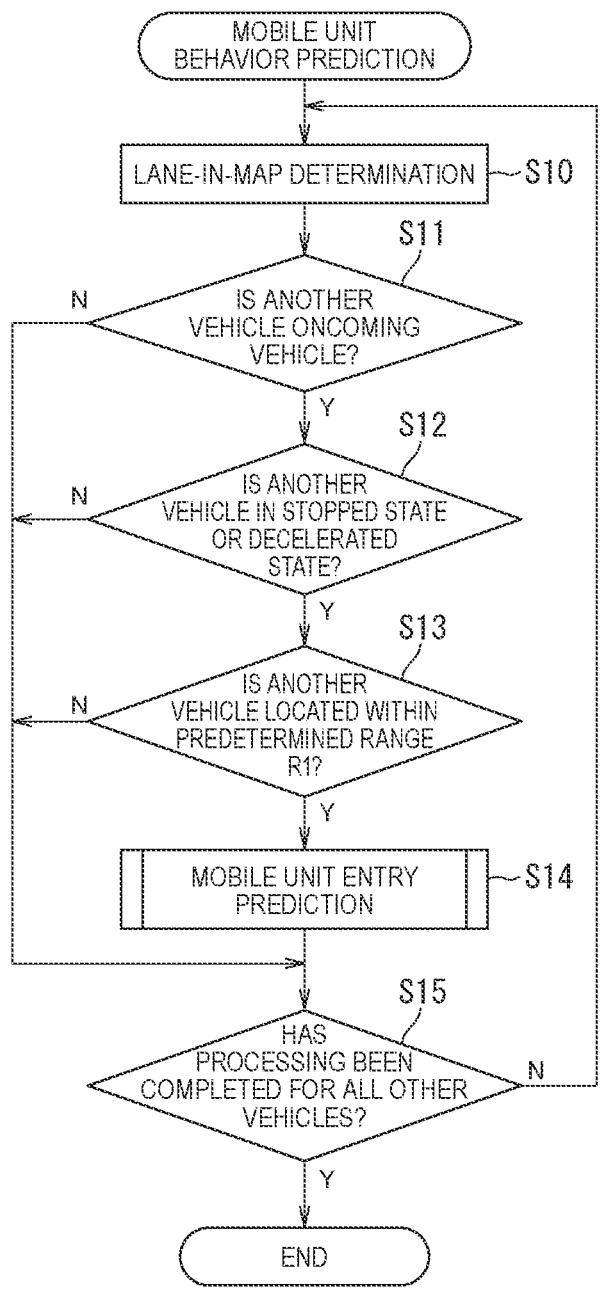
FIG. 5 is a flowchart of a mobile unit behavior prediction routine in the first embodiment.
Figure 6:
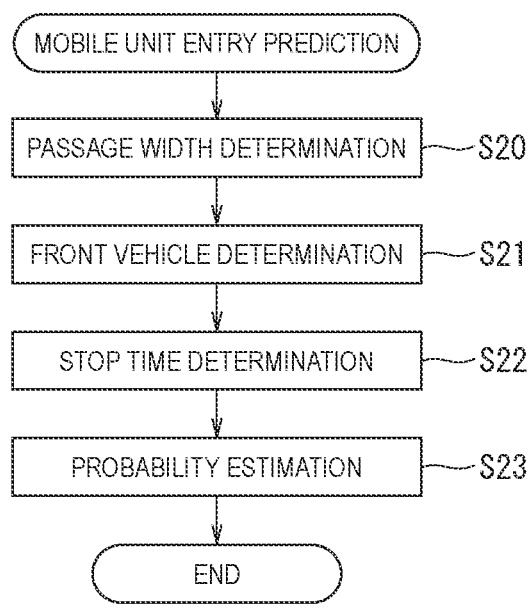
FIG. 6 is a flowchart of a mobile unit entry prediction routine in the embodiments.

Processing in steps S34 to S36 are the same as the processing in steps S13 to S15 in FIG. 5.

Advantageous Effects of Second Embodiment

When it is determined that a turn signal of the another vehicle 4a indicates an intention to turn to the intersecting passage 5, the entry prediction unit 44 predicts that there is a probability that a mobile unit enters the first travel lane 2 from the intersecting passage 5.

Predicting that there is a probability that a mobile unit enters the first travel lane 2 from the intersecting passage 5 as described above enables avoidance behavior to be taken in advance and a situation to be avoided in which a mobile unit entering the first travel lane 2 from the intersecting passage 5 and the host vehicle 1 come close to each other more than necessary and the mobile unit and the host vehicle 1 rapidly decelerate.

Since, when the another vehicle 4a has not turned on a turn signal indicating an intention to turn to the intersecting passage 5, it is possible to predict that no other mobile unit coming out of the intersecting passage 5 is present, it is possible to improve prediction precision of the probability that another mobile unit enters the travel lane in which the host vehicle travels. Since, as a result, it is possible to reduce unnecessary deceleration, stop, or the like, it becomes possible to, for example, generate a target travel trajectory and a speed profile enabling high energy efficiency to be achieved in the autonomous-driving control.

Third Embodiment

Figure 10:
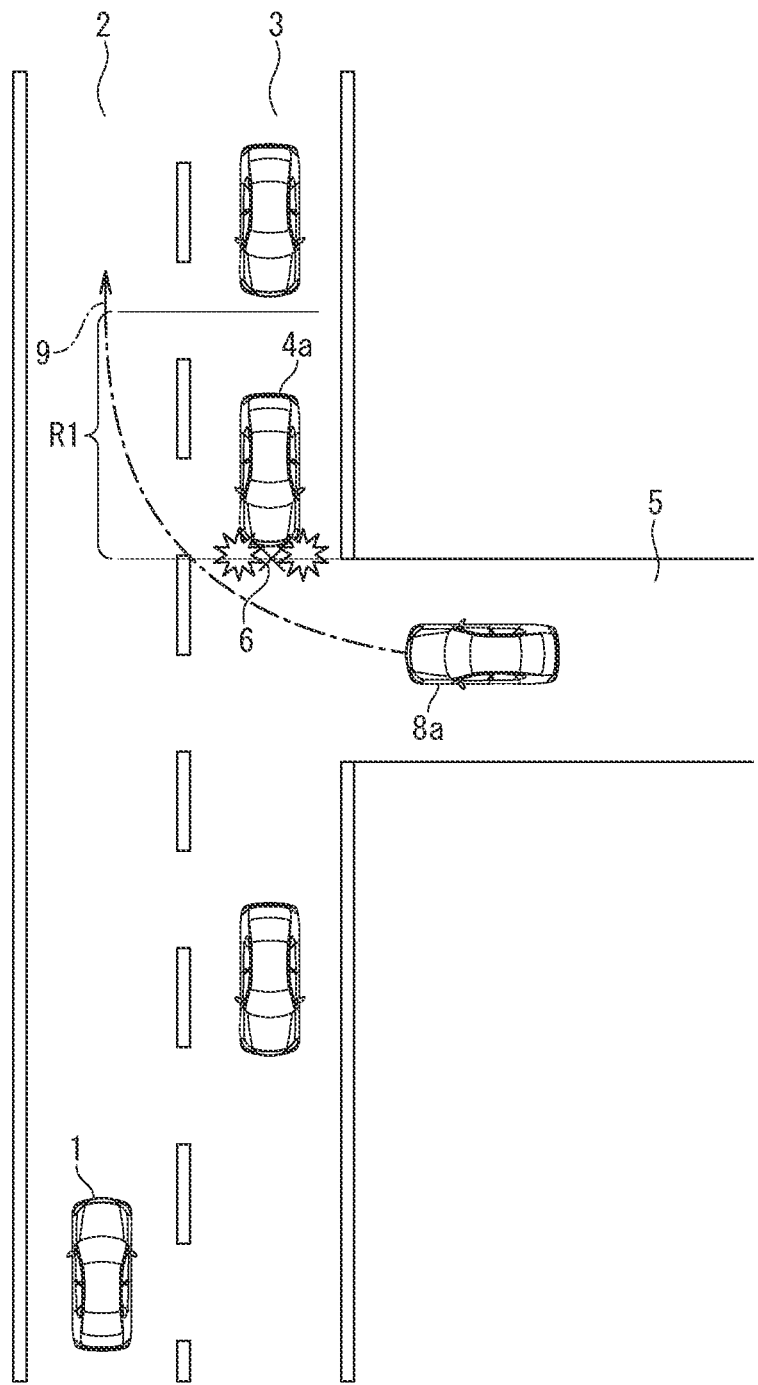
FIG. 10 is an explanatory diagram of a behavior prediction method in a third embodiment.

FIG. 10 illustrates a situation in which another vehicle 4a is in a stopped state or a decelerated state in a predetermined range R1 located before an intersection position 6 and turns on and off the headlights or flashes the headlights. Such an action represents an intention of the another vehicle 4a to yield a path to another mobile unit, and, when, for example, an intersecting passage 5 is a side road or a private property exit, it is considered that a vehicle 8a that is a mobile unit is to come out of the intersecting passage 5 and enter a first travel lane 2 or a second travel lane 3.

Figure 11:
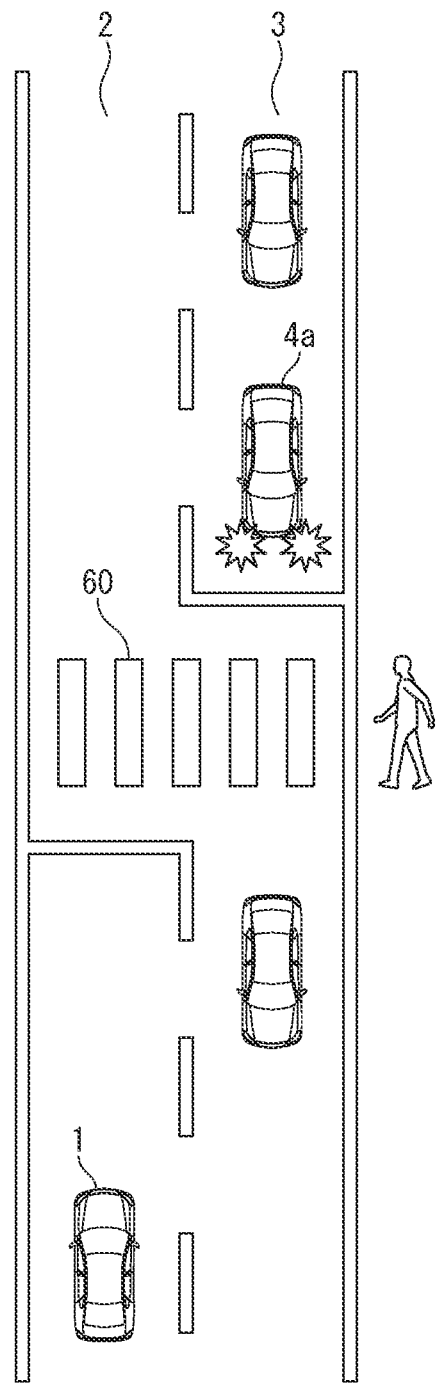
FIG. 11 is an explanatory diagram of another example of an intersecting passage.

In addition, when, for example, the intersecting passage 5 is a crosswalk 60 that crosses the first travel lane 2 and the second travel lane 3 as illustrated in FIG. 11, it is considered that a pedestrian or a bicycle (hereinafter, referred to as "pedestrian or the like") that is a mobile unit is to crosses at the crosswalk 60.

Thus, when a behavior prediction unit 36 detects that the another vehicle 4a is in a stopped state or a decelerated state in the predetermined range R1 located before the intersection position 6 and turns on and off the headlights (or flashes the headlights), the behavior prediction unit 36 predicts that there is a probability that another mobile unit enters the first travel lane 2 from the intersecting passage 5.

Figure 12:
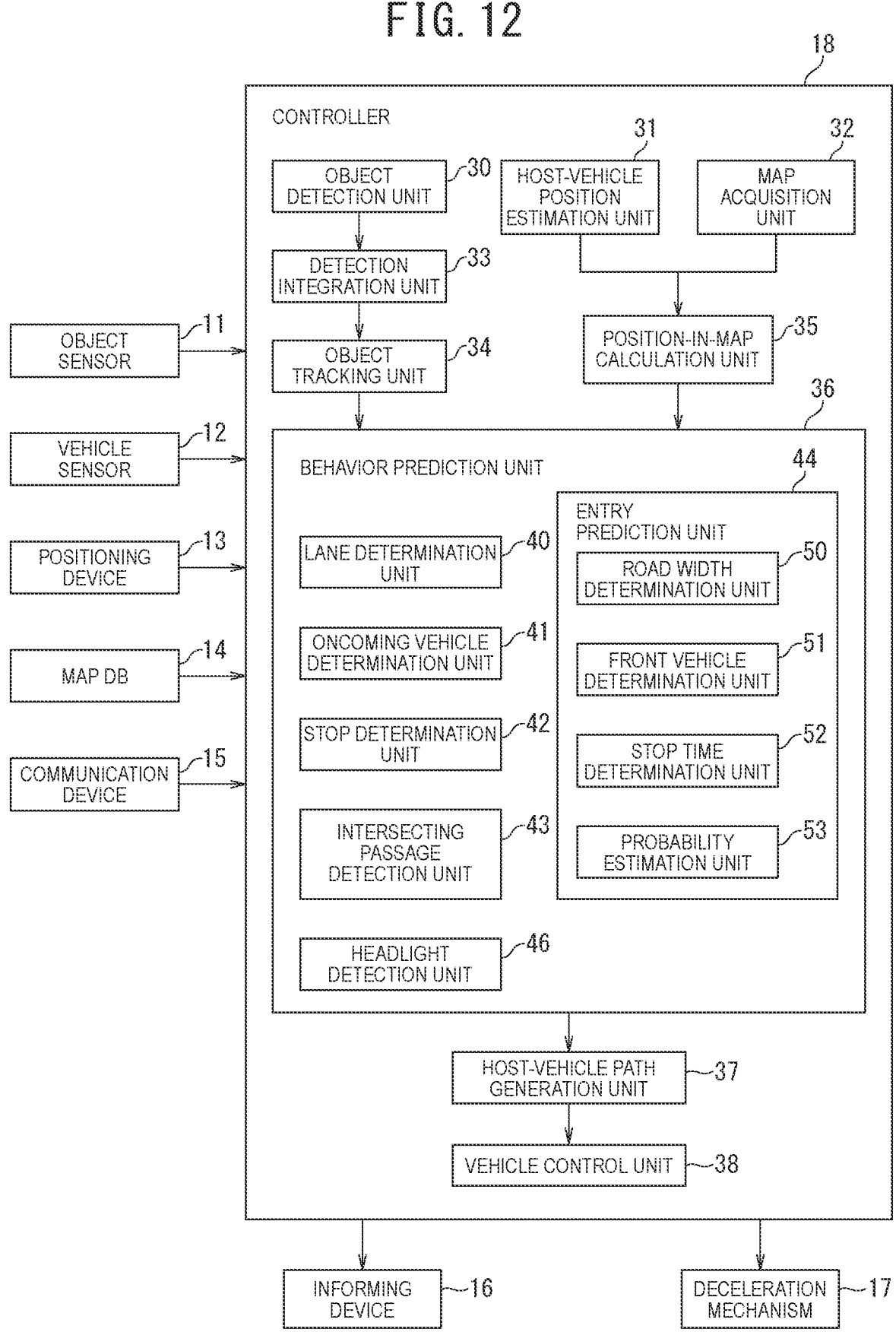
FIG. 12 is a block diagram illustrative of an example of a functional configuration of a travel assistance device in the third embodiment.

FIG. 12 is now referred to. A controller 18 of a third embodiment has a similar functional configuration to the functional configuration of the controller 18 of the first embodiment, and the same reference signs are assigned to the same constituent elements.

The behavior prediction unit 36 includes a headlight detection unit 46.

The headlight detection unit 46 detects turning on and off or flashing of the headlights of the another vehicle 4a. Note that the headlight detection unit 46, for example, includes a camera to capture an image of surroundings of the vehicle as an object sensor 11 and is capable of detecting turning on and off or flashing of the headlights by detecting that an area in which brightness greatly changes (blinking of the headlights) exists in an image that the camera captured. Alternatively, the headlight detection unit 46 may receive a signal indicating turning on and off or flashing of the headlights from the another vehicle 4a by means of vehicle-to-vehicle communication or the like and thereby detect turning on and off or flashing of the headlights. The method for detecting turning on and off or flashing of the headlights of the another vehicle 4a is not specifically limited.

When the another vehicle 4a is in a stopped state or a decelerated state in the predetermined range R1 located before the intersection position 6 and turns on and off or flashes the headlights, the entry prediction unit 44 predicts that there is a probability that another mobile unit enters the first travel lane 2 from the intersecting passage 5.

For example, when the another vehicle 4a is in a stopped state or a decelerated state in the predetermined range R1 located before the intersection position 6 and turns on and off or flashes the headlights, it is considered that, as described above, the vehicle 8a is to enter the first travel lane 2 or a pedestrian or the like is to cross at the crosswalk 60.

In such a situation, the driver of the vehicle 8a or the pedestrian or the like, to which the another vehicle 4a yields a path, sometimes, considering that it is preferable to allow the another vehicle 4a to be restarted soon, comes out of the intersecting passage 5 or crosses at the crosswalk 60 in a rapid movement. When the vehicle 8a or the pedestrian or the like comes out to the travel lane 2 in which the host vehicle 1 travels in such a rapid movement, there is a probability that the vehicle 8a or the pedestrian or the like and the host vehicle 1 come close to each other more than assumed and, in that case, the host vehicle 1 and the vehicle 8a or the bicycle are required to decelerate rapidly.

The entry prediction unit 44 predicting such a situation in advance enables the host vehicle 1 to decelerate and go slowly before the intersecting passage 5 and to avoid rapid deceleration.

On the other hand, when the another vehicle 4a neither turns on and off nor flashes the headlights, the entry prediction unit 44 predicts that there is no probability that another mobile unit enters the first travel lane 2 from the intersecting passage 5.

Since, because of this configuration, it is possible to predict that no other mobile unit coming out of the intersecting passage 5 is present, it is possible to improve prediction precision of the probability that another mobile unit enters the travel lane in which the host vehicle travels.

Figure 13:
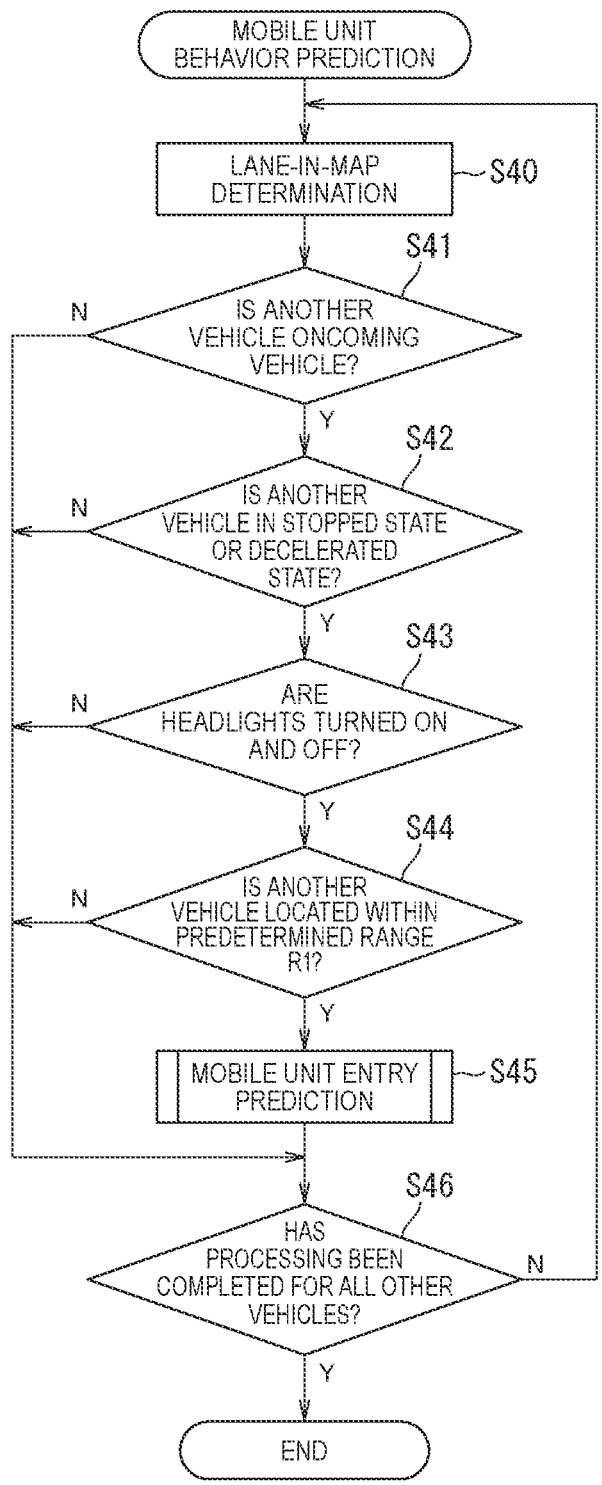
FIG. 13 is a flowchart of a mobile unit behavior prediction routine in the third embodiment.

A mobile unit behavior prediction routine of the third embodiment will be described with reference to FIG. 13. Processing in steps S40 and S41 are the same as the processing in steps S10 and S11 in FIG. 5.

In step S42, a stop determination unit 42 determines whether or not the another vehicle 4a is in a stopped state or a decelerated state. When the another vehicle 4a is in a stopped state or a decelerated state (S42: Y), the process proceeds to step S43. When the another vehicle 4a is neither in a stopped state nor in a decelerated state (S42: N), the process proceeds to step S46.

In step S43, the headlight detection unit 46 detects whether or not the another vehicle 4a in the second travel lane 3 turns on and off or flashes the headlights. When the another vehicle 4a turns on and off or flashes the headlights (step S43: Y), the process proceeds to step S44. When the another vehicle 4a neither turns on and off nor flashes the headlights (step S43: N), the process proceeds to step S46.

Processing in steps S44 to S46 are the same as the processing in steps S13 to S15 in FIG. 5.

Advantageous Effects of Third Embodiment

When it is detected that the another vehicle 4a turns on and off or flashes the headlights, the entry prediction unit 44 predicts that there is a probability that a mobile unit enters the first travel lane 2 from the intersecting passage 5.

Predicting that there is a probability that a mobile unit enters the first travel lane 2 from the intersecting passage 5 as described above enables avoidance behavior to be taken in advance and a situation to be avoided in which a mobile unit entering the first travel lane 2 from the intersecting passage 5 and the host vehicle 1 come close to each other more than necessary and the mobile unit and the host vehicle 1 rapidly decelerate.

Since, when the another vehicle 4a neither turns on and off nor flashes the headlights, it is possible to predict that no other mobile unit coming out of the intersecting passage 5 is present, it is possible to improve prediction precision of the probability that another mobile unit enters the travel lane in which the host vehicle travels. Since, as a result, it is possible to reduce unnecessary deceleration, stop, or the like, it becomes possible to, for example, generate a target travel trajectory and a speed profile enabling high energy efficiency to be achieved in the autonomous-driving control.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Host vehicle
10 Travel assistance device
11 Object sensor
12 Vehicle sensor
13 Positioning device
14 Map database
15 Communication device
16 Informing device
17 Deceleration mechanism
18 Controller
20 Processor
21 Storage device
30 Object detection unit
31 Host-vehicle position estimation unit
32 Map acquisition unit
33 Detection integration unit
34 Object tracking unit
35 Position-in-map calculation unit
36 Behavior prediction unit
37 Host-vehicle path generation unit
38 Vehicle control unit
40 Lane determination unit
41 Oncoming vehicle determination unit
42 Stop determination unit
43 Intersecting passage detection unit
44 Entry prediction unit
45 Turn signal detection unit
46 Headlight detection unit
50 Road width determination unit
51 Front vehicle determination unit
52 Stop time determination unit
53 Probability estimation unit

The invention claimed is:

1. A behavior prediction method for a mobile unit comprising:
   determining a position of a host vehicle;
   determining a position of another vehicle in a second travel lane, the second travel lane being an opposite lane to a first travel lane in which the host vehicle travels;
   detecting an intersecting passage intersecting the second travel lane at an intersection at a position ahead of the host vehicle, the intersecting passage is a road having an exit from which an automobile comes from an outside of the second travel lane, the exit facing the second travel lane;
   determining whether or not the other vehicle is located within a predetermined range from an intersection position of the intersecting passage and the second travel lane to a point away from the intersection position by a predetermined distance in an opposite direction to a traveling direction of a vehicle in the second travel lane and the other vehicle is in either state of a stopped state and a decelerated state;
   when the other vehicle is located within the predetermined range and the other vehicle is in the either state of a stopped state and a decelerated state, predicting that there is a probability that a mobile unit advances from the exit and enters the first travel lane from the intersecting passage, wherein at least one of the mobile unit or the intersecting passage is blocked or hidden from view of the host vehicle when the prediction is made; and
   controlling at least one system of the host vehicle based on the probability that the mobile unit advances from the exit and enters the first travel lane from the intersecting passage.

2. The behavior prediction method according to claim 1, wherein when it is determined that the intersecting passage is hidden in a blind spot when viewed from the host vehicle, the behavior prediction method predicts whether or not there is a probability that the mobile unit enters the first travel lane from the intersecting passage.

3. The behavior prediction method according to claim 1, wherein when it is detected that a turn signal of the other vehicle indicates an intention to turn to the intersecting passage, the behavior prediction method predicts that there is a probability that the mobile unit enters the first travel lane from the intersecting passage.

4. The behavior prediction method according to claim 1, wherein when it is detected that headlights of the other vehicle is turned on and off, the behavior prediction method predicts that there is a probability that the mobile unit enters the first travel lane from the intersecting passage.

5. The behavior prediction method according to claim 1, wherein when it is determined that the intersecting passage is a side road or a private property exit, the behavior prediction method predicts that there is a probability that a vehicle enters the first travel lane from the intersecting passage as the mobile unit.

6. The behavior prediction method according to claim 1, wherein when width of the intersecting passage is less than a predetermined value, the behavior prediction method predicts that probability that the mobile unit enters the first travel lane from the intersecting passage is high.

7. The behavior prediction method according to claim 1, wherein when it is determined that no other vehicle is present in a range of a predetermined distance ahead of the host vehicle in the first travel lane, the behavior prediction method predicts that probability that the mobile unit enters the first travel lane from the intersecting passage is high.

8. The behavior prediction method according to claim 1, wherein when it is determined that stop time of the other vehicle is equal to or greater than a predetermined time, the behavior prediction method predicts that probability that the mobile unit enters the first travel lane from the intersecting passage is low.

9. The behavior prediction method according to claim 1, wherein detecting the intersecting passage is based on map information.

10. The behavior prediction method according to claim 1, wherein, in detecting the intersecting passage, detecting a passage directly connected to the second travel lane from the outside of a road in which the host vehicle travels as the intersecting passage.

11. A behavior prediction device for a mobile unit comprising a controller configured to perform:
    processing of determining a position of a host vehicle;
    processing of determining a position of another vehicle in a second travel lane, the second travel lane being an opposite lane to a first travel lane in which the host vehicle travels;
    processing of detecting an intersecting passage intersecting the second travel lane at an intersection at a position ahead of the host vehicle, the intersecting passage is a road having an exit from which an automobile comes out from an outside of the second travel lane, the exit facing the second travel lane;
    processing of determining whether or not the other vehicle is located within a predetermined range from an intersection position of the intersecting passage and the second travel lane to a point away from the intersection position by a predetermined distance in an opposite direction to a traveling direction of a vehicle in the second travel lane and the other vehicle is in either state of a stopped state and a decelerated state;
    processing of, when the other vehicle is located within the predetermined range and the other vehicle is in the either state of a stopped state and a decelerated state, predicting that there is a probability that a mobile unit advances from the exit and enters the first travel lane from the intersecting passage, wherein at least one of the mobile unit or the intersecting passage is blocked or hidden from view of the host vehicle when the prediction is made; and
    processing of controlling at least one system of the host vehicle based on the probability that the mobile unit advances from the exit and enters the first travel lane from the intersecting passage.

12. A vehicle comprising:
    the behavior prediction device according to claim 10;
    a deceleration mechanism configured to decelerate the vehicle; and
    an informing device configured to inform a passenger on the vehicle of information, wherein
    when the controller predicts that there is a probability that the mobile unit enters the first travel lane from the intersecting passage, the controller, by operating the informing device, informs the passenger of an alarm or, by operating the deceleration mechanism, decelerates the vehicle.

13. The behavior prediction device according to claim 11, wherein detecting the intersecting passage is based on map information.

14. The behavior prediction device according to claim 11, wherein, in processing of detecting the intersecting passage, the controller detects a passage directly connected to the second travel lane from the outside of a road in which the host vehicle travels as the intersecting passage.

\* \* \* \* \*